(12) United States Patent
Fehrenbach

(10) Patent No.: US 6,257,736 B1
(45) Date of Patent: Jul. 10, 2001

(54) LUMINOUS ELEMENT WITH CONTACT LUGS HAVING LONGITUDINAL SLOTS FOR HOLDING ELECTRICAL CONTACTS OF DEVICES IN FIRST AND SECOND PLANES

(75) Inventor: Sebastian Fehrenbach, Radolfzell (DE)

(73) Assignee: TRW Automotive Electronics & Components GmbH & Co. KG (DE)

(*) Notice: Subject to any disclaimer, the term of this patent is extended or adjusted under 35 U.S.C. 154(b) by 0 days.

(21) Appl. No.: 09/367,466

(22) PCT Filed: Feb. 13, 1998

(86) PCT No.: PCT/DE98/00419

§ 371 Date: Nov. 17, 1999

§ 102(e) Date: Nov. 17, 1999

(87) PCT Pub. No.: WO98/35851

PCT Pub. Date: Aug. 20, 1998

(30) Foreign Application Priority Data

Feb. 14, 1997 (DE) .............................. 197 05 738

(51) Int. Cl.$^7$ .................................................. H01R 33/00
(52) U.S. Cl. .......................... 362/226; 362/545; 362/800; 439/419
(58) Field of Search ................................ 362/226, 800, 362/545; 439/890, 617, 419, 404

(56) References Cited

U.S. PATENT DOCUMENTS

| 4,908,743 | 3/1990 | Miller . |
|---|---|---|
| 4,959,761 | 9/1990 | Critelli et al. . |
| 5,408,395 | 4/1995 | Schmid et al. . |
| 5,829,865 | * 11/1998 | Ahroni ................................ 362/226 |

FOREIGN PATENT DOCUMENTS

| 449285 | 10/1991 | (EP) . |
|---|---|---|
| WO96/13866 | 5/1996 | (WO) . |

\* cited by examiner

*Primary Examiner*—Stephen Husar
(74) *Attorney, Agent, or Firm*—Fay, Sharpe, Fagan, Minnich & McKee, LLP

(57) ABSTRACT

A luminous element 1 is provided for illuminating functional symbols or for signaling of functions in a motor vehicle application. The luminous element 1 includes a housing 3 adapted to receive at least one light-producing element 7 having terminal contacts 5a and a pair of contact elements 5 defining longitudinal slots adapted to selectively receive the terminal contacts of the light-producing element and to selectively receive terminal members of an associated electronic component. A first set of longitudinal slots formed by the contact elements extend to a first extent to carry the terminal contacts of the light-producing element in a first plane relative to the housing. A second set of longitudinal slots formed in the contact elements extend to a second extent to carry the terminal members of the associated electronic component in a second plane relative to the housing. The first and second planes are spaced apart to carry the light-producing element in a spaced-apart relationship relative to the associated electronic component.

16 Claims, 4 Drawing Sheets

LUMINOUS ELEMENT WITH CONTACT LUGS HAVING LONGITUDINAL SLOTS FOR HOLDING ELECTRICAL CONTACTS OF DEVICES IN FIRST AND SECOND PLANES

BACKGROUND OF THE INVENTION

The subject invention is directed to the lighting arts and, more particularly, to a luminous element of the type including a housing for mounting the luminous element in an installation opening and having at least one light-producing element with terminal contacts selectively engageable with contact elements provided in the housing. Luminous elements of the type under consideration herein are particularly well-suited for use in illuminating functional signals and for directly displaying functions in motor vehicles and will be described with particular reference thereto. However, it is to be understood that the present invention has other uses and can find utility in a wide range of applications.

Most prior art luminous elements used in automotive applications are designed in such a fashion that they are arranged directly onto a printed circuit board at one or more appropriate predetermined locations. The locations are selected so that following installation of the printed circuit board behind the transparent functional symbols to be illuminated by the transmitted light, such as behind an instrument panel of a motor vehicle, the luminous element is disposed adjacent the functional symbol.

In many instances, miniature incandescent lamps are used as the light-producing elements and are held in suitable housings or sockets. In that case, a recess is typically provided in the printed circuit board at a position where the luminous element is desired to be located. Incandescent lamp sockets can then be selectively inserted and detached from the recess on the printed circuit board. One benefit of this type of arrangement is an ease of exchangeability with respect to the luminous element.

Another previously known luminous element manufactured by Osram consists of a miniature incandescent bulb having terminal contacts which are respectively inseparably connected to a punched-out piece requiring a subsequent bending process. A subassembly is created by the miniature incandescent bulb and the two punched-out pieces. The subassembly is inserted from above into an appropriately designed plastic socket. The upper region of the socket defines a substantially cylindrical neck followed by a contact shoulder formed to adapt the socket housing member into an opening in a printed circuit board. A pair of substantially radially outwardly extending arms are formed by each of the two contact elements in the region above the contact shoulder i.e. in the region of the housing neck. The radially outwardly extending arms respectively act upon the upper or under side of the printed circuit board.

In the above system, a substantially circular recess is formed in the printed circuit board and includes two bulges corresponding to the arms of each contact element. The arms are insertable into the bulges. After twisting of the luminous element around its longitudinal axis by a predetermined angle, the radially outwardly extending arms of each contact element act upon a marginal zone of the opening in the printed circuit board to thereby fasten the luminous element to the printed circuit board. Simultaneously, at least one of the two contact arms of each contact element engages and serves to electrically contact a conductive track formed on the upper or under side of the printed circuit board to thereby supply electrical energy to the luminous element.

Although the previously known luminous elements described above are fairly easily exchangeable from their associated mountings, the manufacture of the luminous elements, however, is usually relatively complicated. One reason is that the sub-system including a miniature incandescent bulb and the electrical contact elements must usually first be pre-manufactured. The sub-system is then subsequently installed in proper aligned configuration into holding recesses formed in a housing socket. Since the contact elements of miniature incandescent bulbs typically as a rule consist of relatively thin flexible wires, insertion of such unstable sub-system into a housing socket typically requires a relatively large amount of effort.

Standard light-emitting diodes (LEDs) have been used in luminous elements. Typically, the LEDs have been handled in a customary fashion in the same manner as any other electronic component, namely by inserting the electrical connection contacts of the LEDs into corresponding bores formed in a printed circuit board and then firmly electrically and mechanically joining the electrical contact connections to the printed circuit board by means of soldering. Although this approach makes for a simple installation, it does not provide simple exchangeability of the light-generating element. While it is true that LEDs, as a rule, have a much longer service life compared with ordinary miniature incandescent bulbs, it has been shown that replacement of the luminous element including LEDs may sometimes become necessary.

In cases such as described above where LED luminous elements must be replaced, the entire printed circuit board must usually be removed from the automotive vehicle or other large system application so that the LED can be loosened from its soldered attachment and replaced. When the work effort involved in desoldering the LED is extreme, a typical solution has been to replace the entire printed circuit board including all of its components. Both methods, however, are costly.

In addition to the above-described needs for replacing LEDs, there also frequently exists the requirement for retrofitting or of simply supplementing the existing LEDs in order to retrofit or equip the target motor vehicle or larger system application with certain additional, improved, or other functions. Retrofitting existing printed circuit boards is oftentimes advantageous to reduce the multitude of required different printed circuit board types that must be produced and inventoried. The flexibility of existing printed circuit boards is enhanced when the desired functions can be selected during installation by mere insertion of the appropriate respective LEDs where needed.

SUMMARY OF THE INVENTION

The subject invention provides a luminous element that overcomes the above-noted problems and is particularly well suited for illumination of functional symbols or for signaling of functions in motor vehicles. The subject luminous element is adapted to be easily installed or exchanged and is at the same time of simple construction to enable easy and cost-effective pre-assembly and manufacture of the luminous element.

In particular, and in accordance with one aspect of the invention, there is provided a luminous element which includes a housing adapted for mounting in an installation opening of an associated installation component, a light-producing element having terminal contacts, and at least two contact elements mounted on the housing and defining longitudinal slots adapted to selectively receive the terminal contacts of the light-producing element in a first plane and to selectively receive terminal members of a second light-producing element or of an associated electronic component, such as a resistor, in a second plane.

By providing longitudinal slots, preferably designed as cutting clips, at least one electrical connection contact of the light-producing element as well as electrical terminals of additional electronic components are selectively received by the at least two contact elements. The result is the benefit of a simple installation of the sub-system consisting of the light-producing element and the at least two electrical contact elements into the housing of the luminous element. Further, this results in the benefit of simple installation of the system consisting of the at least one light-producing element together with additional electrical and/or electronic components into the housing of the luminous element as well.

In accordance with a more limited aspect of the invention, the longitudinal slots formed in the contact elements define slot ends that form differential position planes for receiving the electrical connection contacts of the light-producing element in a first plane and for receiving the electrical terminal members of the additional electronic components in a second plane. In that way, after insertion of the electrical connection contacts of the light-producing element into a longitudinal slot up to the slot edge stop, the additional electronic component is fixed in position by sliding its electrical terminal members into other longitudinal slots up to second slot end stops for fixing the electronic component into position.

One advantage of forming differential position planes using longitudinal slots having different depths is that contact between the terminals of the several light-producing elements and/or the additional electronic components, or between the elements themselves, can be prevented thus avoiding unwelcome electrical or mechanical interference or contact. Furthermore, when applicable, the position of the pre-assembled building elements including the contact elements, the light-producing element, and the additional electronic component can be stabilized and fastened together using additional measures such as, for example, by pre-soldering terminals to the contact elements or by molding the entire system consisting of the light-producing elements, the additional electronic components, if any, and the contact elements with the housing.

In accordance with yet another aspect of the invention, at least two contact elements respectively have at least two substantially parallel terminal lugs. At least one longitudinal slot adapted for accepting electrical terminals is provided in the at least two substantially parallel terminal lugs. This enables the installation of two or more components in respectively separated longitudinal slots such as, for example, two or more light-producing elements or additional electronic components.

In accordance with yet another aspect of the invention, the different lengths of the at least two terminal lugs of each contact element enable quick and easy identification making manual pre-assembly less complicated. More particularly, the different lengths between the two terminal lugs of each contact element makes it easy to identify which terminal lug or into which longitudinal slot the electrical connection contact of the component to be installed is to be inserted. This results in simplification of the assembly particularly in connection with the above-described different longitudinal slot depths for the formation of differential position planes for the electrical connection contacts.

Still further in accordance with another aspect of the invention, the pair of spaced apart substantially parallel contact lugs formed on each of the contact elements enables the area between the adjacent contact lugs to be bent upwardly at right angles so as to form an upwardly bent arm extending radially outwardly toward the outside of the housing of the luminous element. The outwardly extending radial arm advantageously serves as a gripping tab member for holding the luminous element in place within the connection opening and further, selectively serves as an exterior electrical connection contact of the luminous element. The exterior connection contacts as well as the holding elements as described herein are suitably manufactured by means of stamping and bending operations.

Preferably, in accordance with a further aspect of the invention, the contact elements of each luminous element are identically formed resulting in lower manufacturing costs.

In accordance with the present invention, traditional light-producing elements such as commercial miniature incandescent bulbs, as well as commercial LEDs can be used with the luminous elements according to the invention. The minimum requirement for use of incandescent bulbs or commercial LEDs in the present invention is that the electrical connection terminals of the light-producing element are formable in such a fashion or are already formed in such a manner that they can be inserted into the elongate longitudinal slots formed in the contact elements.

In accordance with a still further aspect of the invention, the light-producing element is formed by two LEDs, whereby the connection terminals of the two LEDs are respectively accepted into the same pair of longitudinal slots of the connection terminals. A parallel resistance is oftentimes required when two LEDs are connected in parallel. Accordingly, an integrated protective resistor is inserted with its electrical terminal contacts in respectively two additional longitudinal slots formed by the terminal contacts and fastened therein. Alternatively, the pair of LEDs can be placed in an anti-parallel relationship in accordance with the present invention, such as, for example, in series. Thus, the different depths of the longitudinal slots are advantageous for providing an assurance that the position of the two LEDs as well as the position of the parallel resistance is clearly identifiable.

In accordance with another aspect of the invention, the contact elements are retained in the housing in such a manner that the lower regions of the contact elements with the longitudinal slots are accessible from below relative to the housing for installation of the light-producing element or of the additional electronic components easily. This results in a direct benefit of simple installation of the components of the subject luminous element into the housing from below after the contact elements are in place.

Further, as another benefit, although the contact elements are preferably initially placed in the housing mechanically, the assembly is alternatively manufactured as a single piece by molding the contact elements together with the housing such as using an extrusion process. The light-producing elements or the additional electronic components are then subsequently inserted, preferably singly, into longitudinal slots. Therefore, the simple installation of the components of the luminous element is further enhanced. Thus, it is not necessary to first fasten in position an unstable subassembly consisting of several components and then install the completed unstable sub-assembly, all at once, into the housing, such as was the common practice of the above-described prior art systems.

It is another advantage of the present invention that the contact elements are insertable from the upper side of the housing. This results in the benefit that after installation of the additional elements from the under side of the housing, the entire system is thereafter fastened into the housing in both upward and downward axial directions.

Another advantage of the invention is that one or more coding projections are provided on the housing of the luminous element to ensure proper alignment in a correspondingly counter-coded installation opening of an associated installation component. This provides a particular advantage when LEDs are employed as the light-producing elements to provide unmistakable installation positioning during insertion of the luminous element into the associated installation opening. More particularly, the one or more coding projections on the housing prevents pole reversal of the LEDs.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
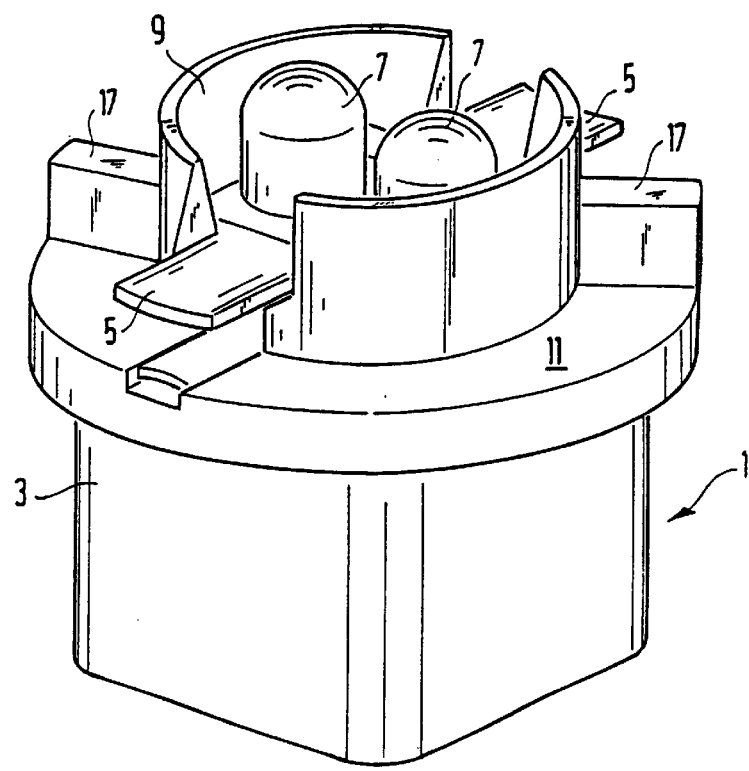
FIG. 1 is a perspective view of an assembled luminous element formed in accordance with the present invention shown with two LEDs as the light-producing elements

Referring now to the drawings wherein the showings are for the purposes of illustrating the preferred embodiment of the invention only and not for purposes of limiting same, FIG. 1 illustrates the overall arrangement of the subject luminous element 1 formed in accordance with the present invention. As shown there, the luminous element includes a housing 3 which is preferably formed as a plastic extrusion component, a pair of contact elements 5 selectively insertable into the housing 3 from above or molded integrally together with the housing, and a pair of light-producing elements 7 preferably in the form of a pair of luminous light emitting diodes (LEDs).

Figure 5A:
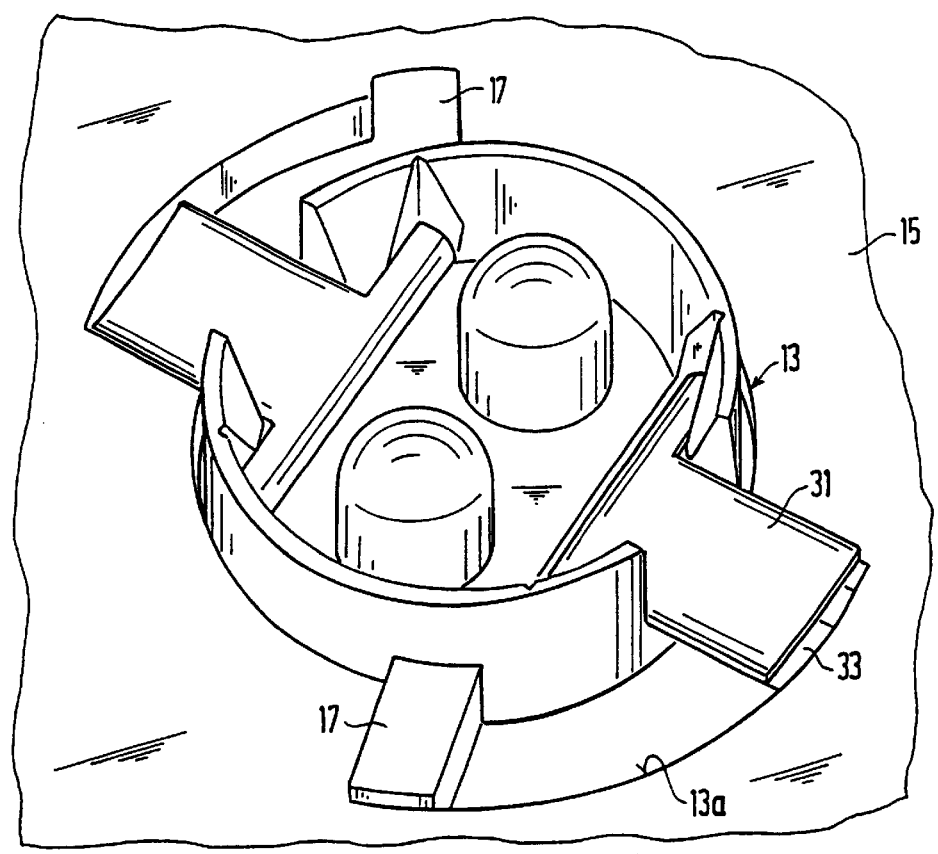
FIG. 5a is a perspective top view of the luminous element shown in FIG. 1 illustrated disposed in a first position within an installation opening of an associated installation component; and, FIG. 5b is a top perspective view illustrating the luminous element shown in FIG. 5 disposed in the installation opening and rotated about its longitudinal axis for fixation and contact establishment therein.
Figure 5B:
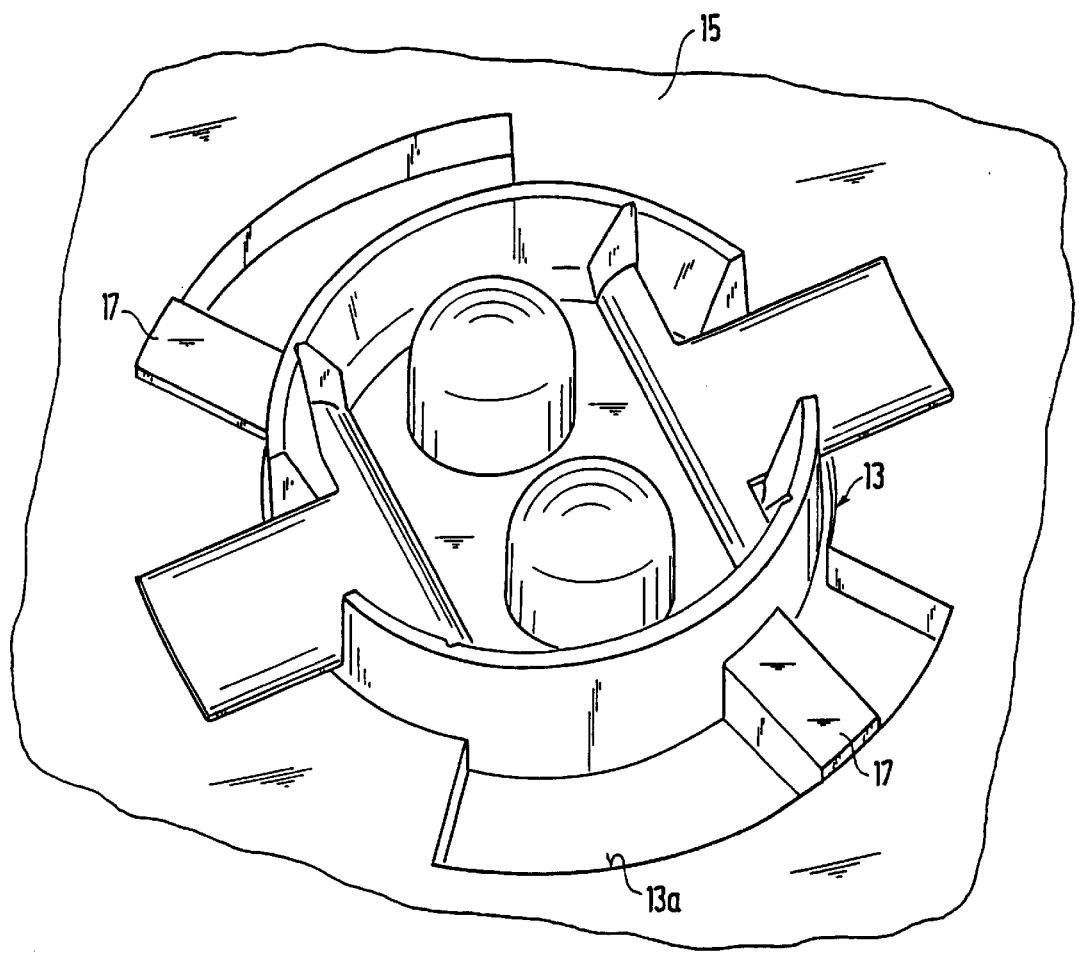

As can be seen, the housing defines an upper substantially cylindrical neck portion 9 surrounded by an outer flat contact shoulder 11. The contact shoulder 11 and the cylindrical neck 9 adapt the housing 3 for mounting into an associated installation opening 13 of an associated installation component such as, for example, into an opening of a printed circuit board as best shown in FIG. 5. A pair of raised radial coding projections 17 are formed on the contact shoulder 11. As will be explained below in connection with FIGS. 5a and 5b, the coding projections 17 prevent electrical pole reversal during installation of the subject luminous element into the printed circuit board opening.

Figure 2:
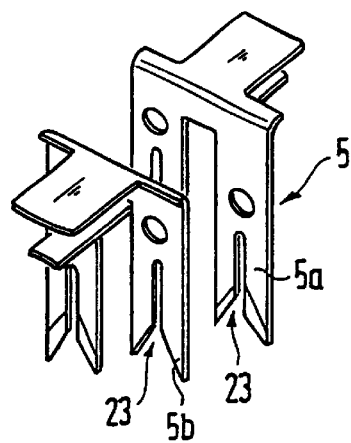
FIG. 2 is an exploded perspective view illustrating the individual components of the luminous element shown in FIG. 1.
Figure 2:
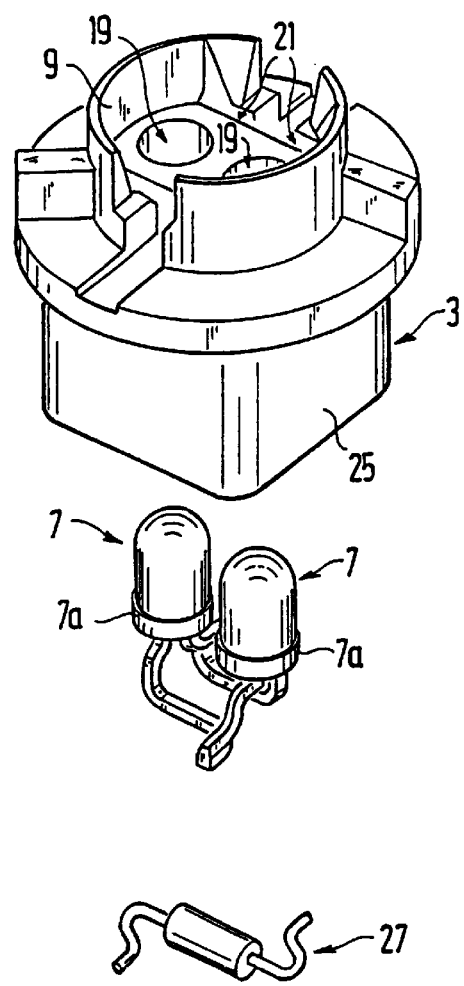

As shown best in FIG. 2, the housing 3 has two openings 19 extending in parallel relative to the longitudinal axis of the housing. The openings 19 are adapted to receive a pair of light-producing elements 7, preferably LEDs 7. The LEDs are inserted into the underside of the housing from below. As shown in FIG. 2, the LEDs preferably include a lower bulged out cylindrical region 7a for engaging a corresponding complementary pocket region within the openings 19 (not shown) for accurately locating the LEDs within the housing and for preventing them from slipping through the housing in an upward direction. The cylindrical region 7a additionally enables correct placement of the LEDs along the longitudinal axis of the housing 3.

With continued reference to FIG. 2, the housing further includes a pair of spaced apart openings 21 extending respectively substantially parallel to the longitudinal axis. Each of the openings 21 is adapted to receive one of a pair of identically formed contact elements 5. Each of the contact elements 5 includes a pair of downwardly extending contact lugs 5a, 5b as shown. Preferably, the contact elements 5 are formed in a fashion that the pair of contact lugs 5a, 5b extend into the openings 21 substantially along the longitudinal axis of the housing. Further, and of particular importance to the present invention, the contact lug pairs 5a, 5b of each contact element 5 have a differential length whereby the first set of contact lugs 5a are longer in the longitudinal axis of the housing than the second set of contact lugs 5b. As shown in the figure, each of the contact lugs 5a, 5b define a longitudinal slot 23 adapted for receiving one or more terminal contacts of the LEDs 7 and/or additional electrical components 27 as will be described in greater detail below.

Figure 3:
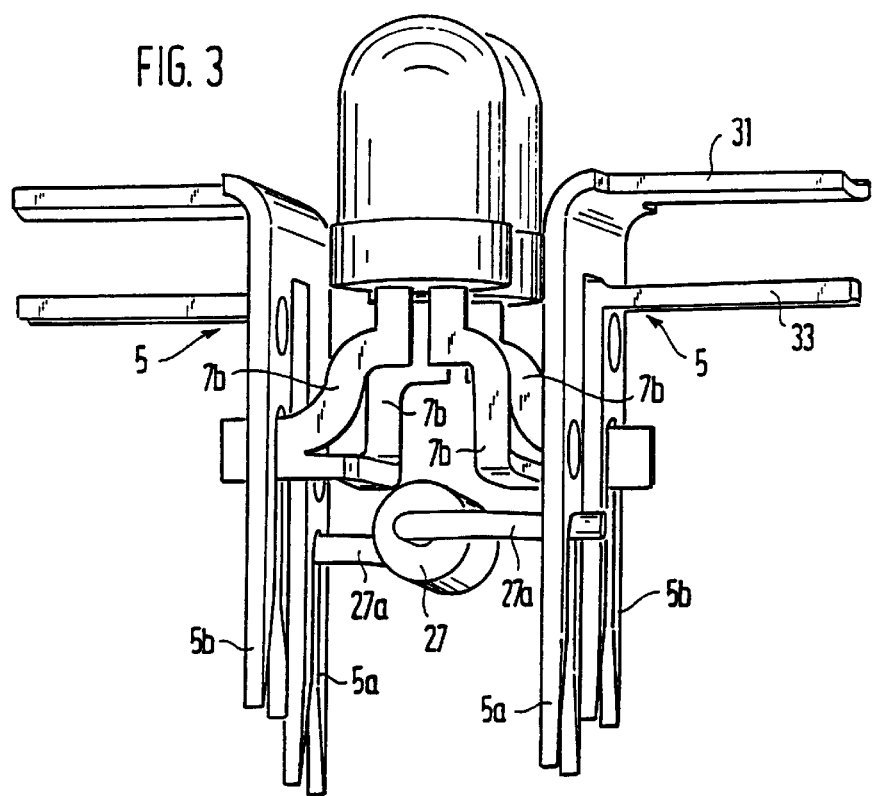
FIG. 3 is a perspective view illustrating the electrical components of the subject luminous element according to FIG. 1 shown in their relative operative arrangement.

In accordance with another important aspect of the invention, as can be seen best in FIGS. 2 and 3, the longitudinal slots 23 of the longer set of contact lugs 5a are formed having a depth less than the longitudinal slots 23 of the shorter set of contact lugs 5b. FIG. 3 shows that the relative differences between the depths of the longitudinal slots 23 relative to a datum on the housing, such as the shoulder 11 for example, enable the light-generating elements and other electrical components to be attached to the contact elements 5 in spaced apart parallel planes. Preferably, each longitudinal slot 23 is formed as a cutting clip.

With continued reference to FIG. 2, the lower region 25 of the housing 3 is preferably shaped having a rectangular or a square cross-section. In that way, the housing 3 can be easily rotated using an appropriate tool such as, for example, a fork wrench, along its longitudinal axis for mounting the subject luminous element 1 in an associated installation opening 13.

Turning now with particular reference to FIG. 3, the electrical components of the subject luminous element are shown in their respective operative positions. Essentially, the electrical components are shown in FIG. 3 with the housing 3 removed to clarify the relative operative positions between the components. As is apparent from FIG. 3, the pair of LEDs 7 are connected to each other by a common or shared set of terminal contacts 7b. More particularly, the terminal contacts 7b are shaped in a suitable manner so that the two LEDs 7 are placed next to each other at a predetermined height and at a predetermined separation distance so that this spacing matches the location of the pair of openings 19. Suitable methods of joining the terminal contacts 7b of the LEDs 7 include, for example, soldering, cold forging such as using a press procedure, or other similar operations. One benefit of joining the terminal contacts 7b of the LEDs together is that following installation of the contact elements 5 into the housing body 3, the pair of LEDs 7 can easily be inserted into the longitudinal slots 23 of the contact lugs 5a, 5b in a single step.

As briefly described above, the longitudinal slots 23 are preferably formed as cutting clips. In that way, the terminal contacts 7b are connected securely to the contact elements 5 by means of simply inserting the terminal contacts into the longitudinal slots in a single easy step. Alternatively, the two LEDs 7 can be provided without a shared set of contacts 7b. In that case, each single LED is installed into the respective longitudinal slot without first joining the connection contacts 7b together.

With continued reference to FIG. 3, the connection contacts 7b of the LEDs are preferably inserted into the deeper longitudinal slots 23 of the shorter set of contact lugs 5b. In that way, a set of terminal members or connection contacts 27a of an additional electronic components preferably a parallel resistance 27 can be inserted into the longitudinal slots of the longer set of contact lugs 5a. Preferably, the connection contacts 27a of the parallel resistance 27 are bent into shape within a single plane so that the ends of the connection contacts 27a of the parallel resistance 27 can be easily inserted into the corresponding longitudinal slots 23 of the longer set of contact lugs 5a.

As best shown in FIG. 3, the parallel resistance 27 is positioned below the connection contacts 7b and below the LEDs 7 relative to a datum on the housing. Since the longitudinal slots 23 of the longer set of contact lugs 5a extend to a depth less than the longitudinal slots 23 of the shorter contact lugs 5b relative to a datum on the housing, after insertion of the terminal contacts 7b of the light-producing element up to the stop end of the slot followed by insertion of the connection contacts 27a of the parallel resistance 27 up to the stop edge of the longitudinal slot, the light-producing element 7 is held in a first plane and the parallel resistance 27 is held in a spaced apart second plane.

It is to be appreciated that following installation of the LEDs and/or of the parallel resistance, the respective connection contacts 7a and 27a can, of course, also be connected with the contact lugs 5a, 5b by soldering, welding, or similar techniques. Where appropriate, where soldering or welding techniques are used, the contact lugs need not be formed as cutting clips.

Figure 4:
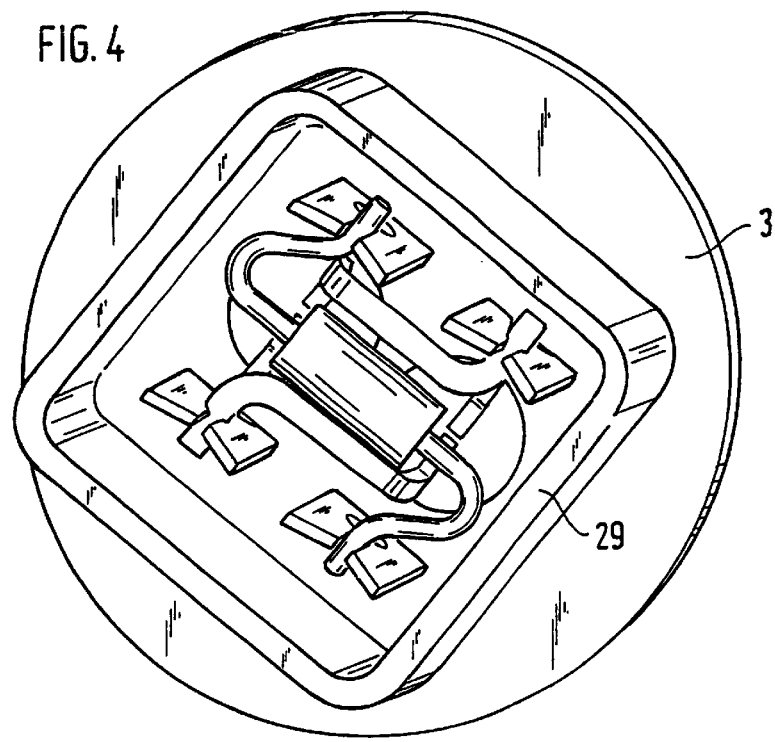
FIG. 4 is a bottom perspective view of the luminous element illustrated in FIG. 1.

With reference now to FIG. 4, the position of the electrically active components is shown in a perspective view from below the housing 3. As shown, the housing 3 includes a projection 29 extending in a downward direction. The projection forms a wall that encases the electrically active components of the luminous element 1 protruding beyond the underside of the housing 3.

It is to be understood that the area enclosed by the projection 29 can be filled after installation of the electrically active components of the luminous element 1 with suitable synthetic resins, or other materials in order to further fix the position of the individual components and/or to protect the components from environmental influences.

It is to be further understood that alternatively a lid (not shown) could be used to protect the component from environmental influences. A lid preferably placed from below onto the projection 29 protects the components encased by the wall and disposed under the lid. In addition, the lid can be formed having projections extending into the interior of the wall encased by the projection 29. The projections on the lid preferably act upon the resistance 27 and/or the LEDs or their connection contacts 7b to thus fix the same in place. The lid is fastened to the projection 29 and/or to the underside of the housing 3 by means of pressing, glueing, welding, or the like.

FIGS. 5a and 5b show the subject luminous element 1 according to the present invention installed in an associated installation opening 13 of an associated installation element 15 such as, for example, an opening in a printed circuit board. The preferred installation opening is substantially circular and is sized to accommodate the outer cylindrical diameter of the neck 9 of the housing 3. In addition, the preferred installation opening includes coding recesses 13a which are adapted to engage with the coding projections 17 of the housing 3. The coding recesses 13a are preferably shaped and arranged so that they permit the twisting of the luminous element 1 in the installation of opening 13 through a predetermined angle.

The coding recesses 13a, combined with the coding projections 17 and further in combination with a set of outwardly directed radially extending arms 31, 33 formed by the contact elements, allow only a single clearly defined installation position of the luminous element relative to the associated opening 13.

Preferably, the radially outwardly extending arm 31 is formed by the contact elements 5 by means of simply bending an appropriate upper region of a punched-out part of the contact element. The lower arm 33, however, is preferably produced in a simple fashion by bending a region positioned between the two contact lugs 5a, 5b upwardly as shown best in FIGS. 2 and 3. Preferably, each set of arms 31, 33 extend outwardly in a parallel relationship. Further, the distance between the outwardly extending parallel arms 31, 33 of each set is slightly smaller than the thickness of the corresponding region of the associated installation element in the area of the installation opening in order to ensure safe contacting and fastening of the luminous element.

Following installation of the luminous element 1 from the underside into the installation opening 13 (position according to FIG. 5a) the luminous element is fixed into place in the installation opening by simply twisting the luminous element about its longitudinal axis. The predefined twist angle required for fixing the luminous element into place is determined by the shape and arrangement of the coding recess 13a and the coding projections 17. As is apparent from FIG. 5b, the luminous element is simply twisted about its longitudinal axis until one of the coding projections 17 abuts a limiting wall serving as a stop of the respective coding recesses 13a. The final installation position of the luminous element 1 relative to the associated installation component 15 is shown best in FIG. 5b.

In the final installation position, the inwardly facing face surfaces of the radially extending arms 31, 33 grip the upper and under side of the installation component 15 and, in this manner, fix the luminous element within the installation opening. At the same time, the outwardly extending arms 31 preferably form an electrical contact with the installation component for supplying energy to the luminous element 1 from conductive elements (not shown) disposed on the upper side and/or the lower side (using arm 33) of the installation opening 15. Preferably, the installation component is a printed circuit board or another board carrying electrical conductors. The position of the printed circuit board and/or of the connection contacts on the side of the installation piece is preferably selected in such fashion that the one or more conductive connection contacts are respectively contacted in the final installation position by at least one of the two arms 31, 33.

The luminous element according to the present invention is selectively equipped with a board provided in the housing 3 such as, for example, a board fitted with SMD components. The connection contacts within the board are likewise installable in contact lugs 5a, 5b or by other means so as to electrically connect the SMD components with the contact elements 5.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is clamed is:

1. A luminous element comprising:
   a housing adapted for mounting in an installation opening of an associated installation component;
   a light-producing element; and,
   at least two contact elements mounted on the housing and defining longitudinal slots adapted to selectively receive the terminal contacts of the light-producing element in a first plane and to selectively receive terminal members of an associated electronic component in a second plane.

2. The luminous element according to claim 1 wherein said longitudinal slots defined by said at least two contact elements are formed as cutting clips having edges adapted to simultaneously electrically contact and position locate said terminal contacts and said terminal contacts relative to said housing.

3. The luminous element according to claim 1 wherein:
   a first set of said longitudinal slots extend in said at least two contact elements to a first extent at a first slot end to carry the terminal contacts of the light producing element in said first plane relative to the housing; and,
   a second set of said longitudinal slots extend in said at least two contact elements to a second extent at a second slot end to carry the terminal members of the associated electronic component in said second plane relative to the housing.

4. The luminous element according to claim 1 wherein each of said at least two contact elements includes a pair of parallel terminal contact lugs, each of the parallel contact lugs defining at least one longitudinal slot.

5. The luminous element according to claim 4 wherein each of said at least two contact elements includes a pair of parallel terminal contact lugs having different lengths.

6. The luminous element according to claim 5 further including a set of exterior contacts extending radially outwardly from the housing, the set of contacts being defined by a region of said contacts elements between said contact lugs bent away from the contact lugs to extend in said outward radial direction.

7. The luminous element according to claim 1 wherein an upper region of said at least two contact elements radially outwardly at substantially a right angle relative to said terminal contact lugs and substantially in parallel with said associated installation component.

8. The luminous element according to claim 1 wherein said at least two contact elements are substantially identically formed.

9. The luminous element according to claim 1 wherein said light-producing element is an LED.

10. The luminous element according to claim 1 wherein said associated electronic component is a resistor.

11. The luminous element according to claim 1 wherein said light-producing element is a pair of LEDs having terminal contacts received in said at least two contact elements.

12. The luminous element according to claim 1 wherein:
    said at least two contact elements include longitudinal slots; and,
    lower ends of said at least two contact elements extend from a bottom side of said housing to selectively receive the terminal contacts of the light-producing element in said first plane adjacent said bottom side of said housing and to selectively receive said terminal members of said associated electronic component in said second plane adjacent said bottom side of said housing.

13. The luminous element according to claim 12 wherein said housing is adapted to receive said at least two contact elements from a side opposite said bottom side.

14. The luminous element according to claim 13 wherein:
    said housing defines an opening; and,
    said opening is adapted to receive said light producing element by inserting the light-producing element into said opening from said bottom side of the housing.

15. The luminous element according to claim 1 wherein said housing defines a contact shoulder adapted to contact the associated installation component when the housing is received in said installation opening.

16. The luminous element according to claim 1 wherein said housing defines a set of coding projections adapted to mechanically cooperate with an associated corresponding set of coding recesses formed in said installation opening to locate said housing in said installation opening in a predetermined relative position.

* * * * *